United States Patent [19]

Lauffer

[11] Patent Number: 4,828,446

[45] Date of Patent: May 9, 1989

[54] PNEUMATICALLY OPERATED STOP FOR ADVANCED WORKPIECES

[75] Inventor: Adelbert Lauffer, Reutlingen, Fed. Rep. of Germany

[73] Assignee: Chr. Eisele Maschinenfabrik GmbH & Co. KG, Kongen, Fed. Rep. of Germany

[21] Appl. No.: 210,741

[22] Filed: Jun. 23, 1988

[30] Foreign Application Priority Data

Jun. 30, 1987 [DE] Fed. Rep. of Germany ....... 3721530

[51] Int. Cl.[4] .............................................. B23Q 5/26
[52] U.S. Cl. ................................... 414/17; 83/467 R; 269/329; 198/345; 198/634
[58] Field of Search ............................. 414/14, 17, 18; 83/467 R, 468, 726, 722, 719; 293/107; 269/329; 271/224, 243, 244; 198/345, 634, 463.4, 463.6

[56] References Cited

U.S. PATENT DOCUMENTS

| 3,049,349 | 8/1962 | Siglow | 271/224 |
|---|---|---|---|
| 3,113,767 | 12/1963 | Halberstadt | 198/345 X |
| 3,155,242 | 11/1964 | Magloire | 414/17 |
| 3,656,791 | 4/1972 | Truesdell | 293/107 |
| 4,344,609 | 8/1982 | Bond | 83/726 X |
| 4,409,979 | 10/1983 | Nowak | 414/17 X |

FOREIGN PATENT DOCUMENTS

| 140667 | 4/1951 | Australia | 83/726 |
|---|---|---|---|
| 522517 | 3/1956 | Canada | 83/726 |

Primary Examiner—Frank E. Werner
Assistant Examiner—William M. Hienz
Attorney, Agent, or Firm—John C. Evans

[57] ABSTRACT

A pneumatically operated stop for advanced workpieces comprises a pneumatic cylinder with a displaceable piston rod on which a stop is secured. A limit stop coacting with the extended piston rod defines the setpoint position of the stop. A precision limit switch for sensing the setpoint position of the stop generates a command signal when the stop moves away from its setpoint position. This signal controls a valve which is connected with the pneumatic cylinder. This valve connects the pneumatic cylinder in an unpressurized manner with the ambient atmosphere when the stop is occupying the setpoint position and no workpiece is resting against the stop. Once the stop has been displaced from its setpoint position by an advanced workpiece, pressure is applied to the cylinder by this valve in order to return the stop together with the workpiece to the setpoint position, and this pressure is maintained for a preselected amount of time by the valve.

1 Claim, 3 Drawing Sheets

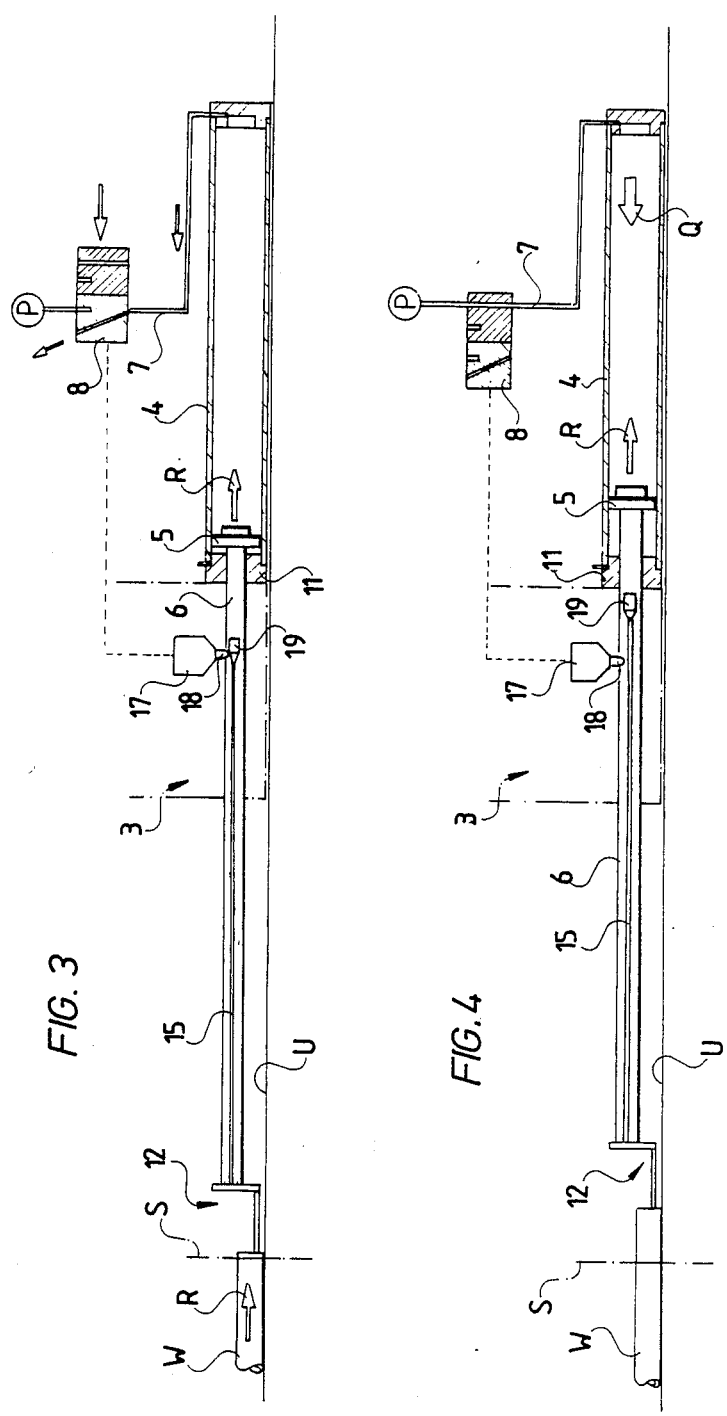

PNEUMATICALLY OPERATED STOP FOR ADVANCED WORKPIECES

The invention relats to a pneumatically operated stop for advanced workpieces.

In the course of commercial or industrial production, workpieces frequently have to be placed against a stop for correct positioning. This applies, for example, to pipes from which pieces of preselected length have to be cut, the length of an individual piece being determined by the distance between the stop and the blade of the saw. The more precisely the advanced workpiece is placed against the stop, the greater is the accuracy of this length.

A problem which must be overcome in this procedure is that the workpiece frequently exhibit a considerable mass and are advanced against the stop at a high velocity. Suitable provisions are, therefore, necessaryto avoid shock-type rapid deceleration of the workpieces, which could result in damage to the stop or to the workpieces.

The object of the invention is to design a pneumatically operated stop for advanced workpieces so that it enables exact positioning of the workpieces with simple means, even if the workpiece should hit the stop with considerable force.

In accordance with the inventio, the object is achieved by the following features:

(A) a pneumatic cylinder with a displaceable piston rod on which the stop is secured;

(B) a limit stop coacting with the extended piston rod to define the setpoint position of the stop;

(C) a limit switch for sensing the setpoint position of the stop and for generating a signal when the stop moves away from the setpoint position;

(D) a valve connected with the pneumatic cylinder and controlled by the limit switch, which valve
  1. connects the cylinder in an unpressurized manner with the ambient atmosphere when the stop is occupying the setpoint position and no workpiece is resting against the stop.
  2. applies pressure to the cylinder as soon as the stop has been displaced from its setpoint position by an advanced workpiece in order to return the stop together with the workpiece to the setpoint position, and
  3. maintains this pressure for a preselected amount of time, thereby keeping the stop in the setpoint position.

The following description of a preferred embodiment of the invention serves in conjunction with the appended drawings to explain the invention in further detail.

In the drawings:

FIGS. 3 and 4 are schematic illustrations of the mode of operation and control system of the stop.

Figure 1:
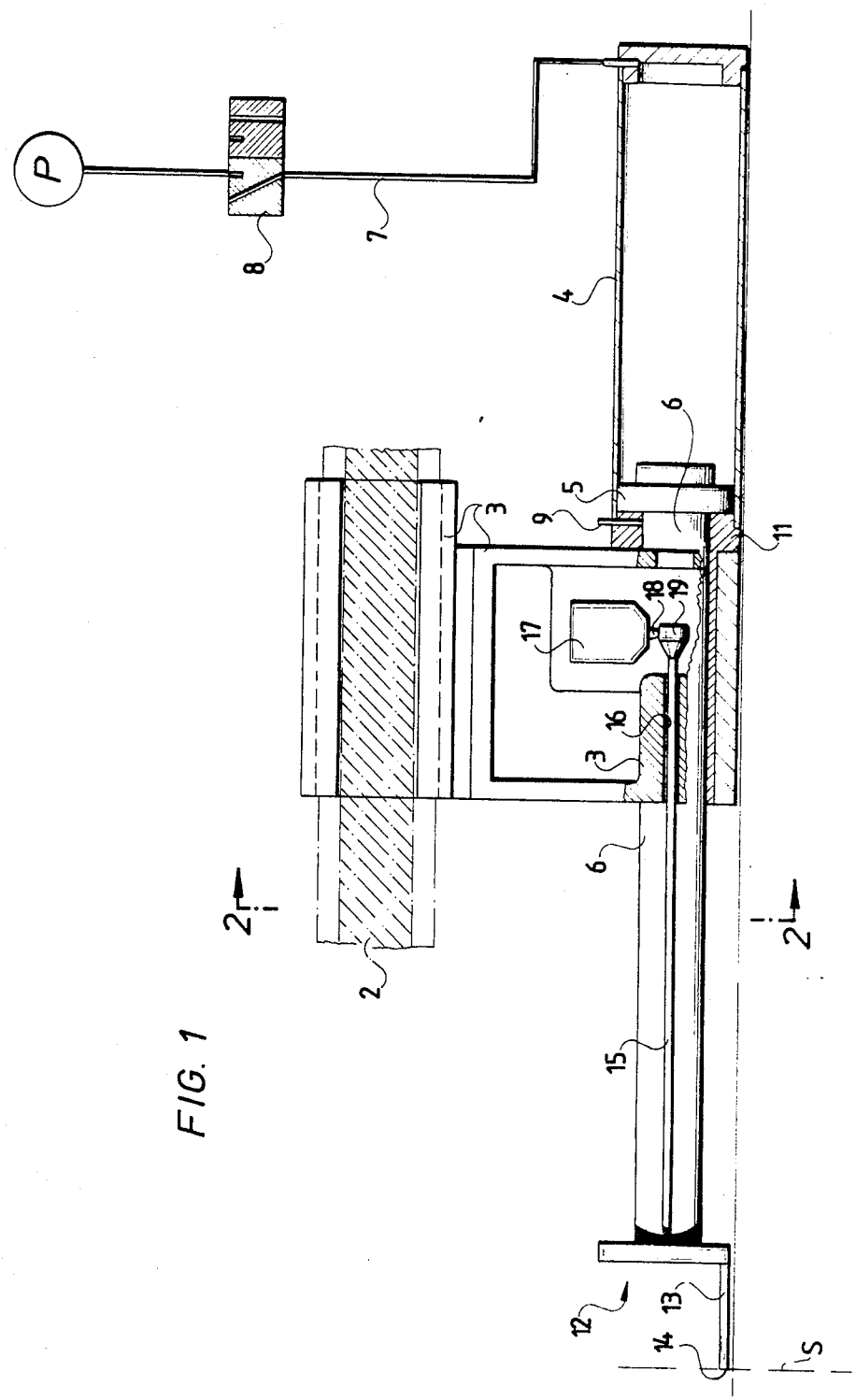
FIG. 1 is a schematic view of a pneumatically operated stop for advanced workpieces, with some parts shown in cross-sectional representation.

A horizontal guide rail 2 is fixedly connected to a machine frame 1, and a carriage 3 slides b ack and forth on guide rail 2. A pneumatically operated cylinder 4 also extending in a horizontal direction is firmly attached to the rear side of carriage 3. A piston 5 on a piston rod 6 is slidingly displaceable inside cylinder 4. A supply pipe 7 for compressed air contains an electrically remote-controlled valve 8 which selectively connects or disconnects pipe 7 with a source P of compressed air. The cylinder 4 is additionally connected with a venting pipe 9 which, if required, may also be used in a known way to admit compressed medium in order to return piston 5 to the retracted position (in FIG. 1 towards the right-hand end of the cylinder).

A front end wall 11 of cylinder 4 serves as limit stop for piston 5. This limit stop 11 can be provided in a known way with a sensor, for example, a non-contacting switch, which causes the supply of compressed medium via pipe 7 to be interrupted when piston 5 touches the limit stop formed by end wall 11 so piston 5 will be held in this limit position by the compressed medium present in cylinder 4.

A stop 12 of L-shaped cross-section is firmly attached to the free end of piston rod 6. The front face 14 of the lower, horizontally oriented leg 13 of stop 12 constitutes the actual stopping surface for workpiece W to be positioned thereagainst (see FIGS. 3 and 4).

The actual setpoint position in which the workpieces W should come to rest against stop 12 is indicated by the plane S denoted by a sequence of dots and dashes in FIGS. 1, 3 and 4. To bring stop 12 into the setpoint position, the piston 5 with the piston rod 6 is first extended out of cylinder 4 until piston 5 rests against the limit stop formed by the end wall 11 and stays in that position. Subsequently, carriage 3, and with it cylinder 4, is moved on rail 2 until the front face 14 of stop 12 coincides with the plane S. The carriage 3 is then arrested in that position.

Figure 2:
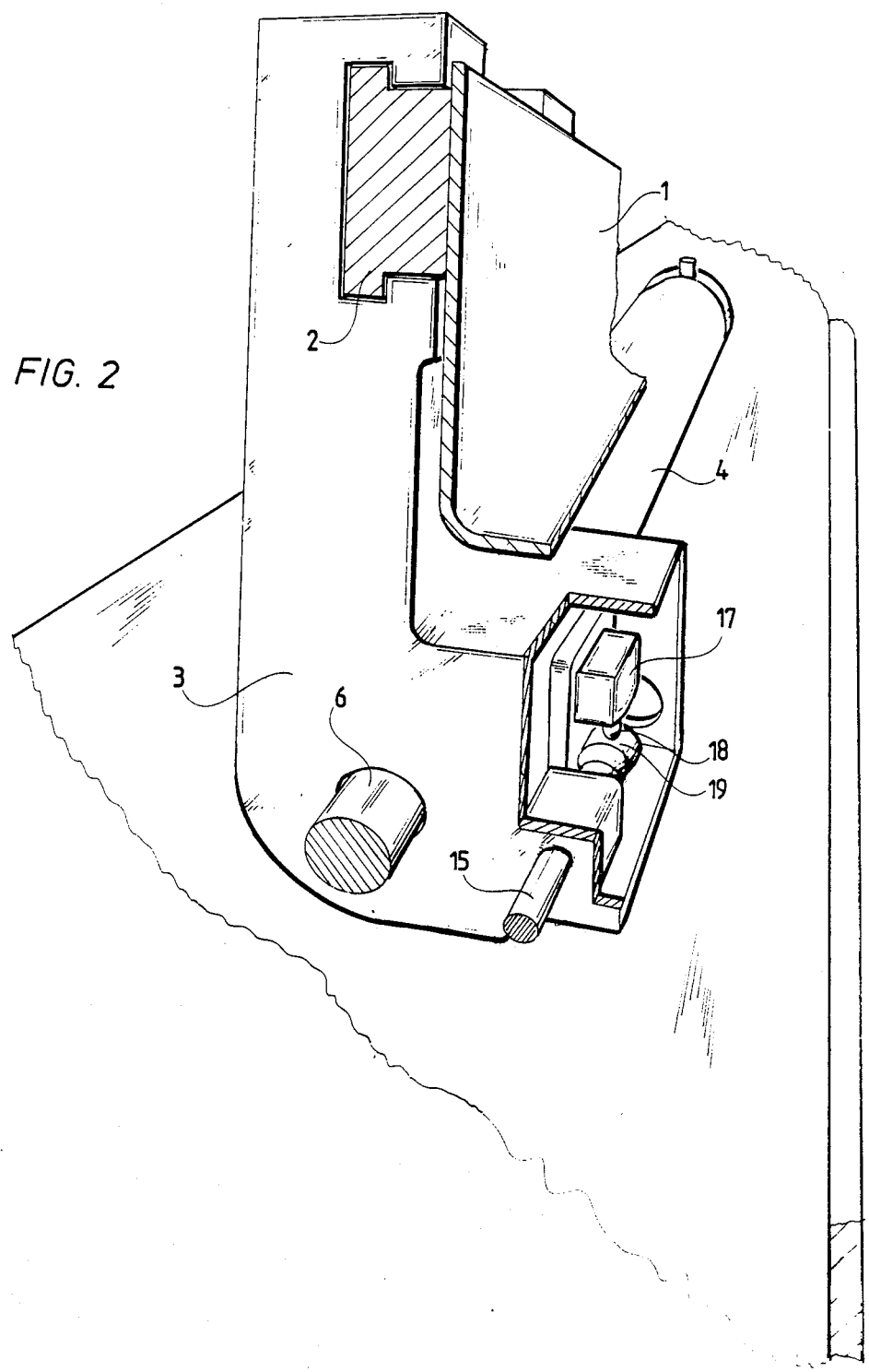
FIG. 2 is a cross-sectional view taken on line 2—2 in FIG. 1.

As shown, in particular, in FIG. 2, a further thinner rod 15 extendig parallel to the piston rod 6 is connected to stop 12. At its rear end section remote from stop 12, rod 15 is slidingly guided in a guide bearing 16 of carriage 3. Attached to carriage 3 is a limit switch 17, the feeler pin 18 of which coacts with an actuating head 19 arranged on rod 15. In the position of the assembly depicted in FIG. 1, the feeler pin 18 is held in a specific position by the actuating head 19. As soon as the piston 5, and with it the piston rod 6, and the stop 12 move (in FIG. 1 towards the right), the actuating head 19 is released from the feeler pin 18, thereby causing the limit switch 17 to issue a signal. As shown by a dashed line in FIG. 3, the limit switch 17 is connected to valve 8 by a control line and thus controls operation of this valve in the manner described below.

The description of the operation of the stop device starts with the position assumed by the assembly in FIG. 1. The stop 12 is in its setpoint position and the piston 5 is resting against the end wall 11 of cylinder 4 acting as limit stop for the piston 5. The rod 15 is in such a position as to actuate the feeler pin 18 and hence the limit switch 17 in a defined manner by means of the actuating head 19. The valve 8 is in a position in which the pipe 7 is vented to the ambient atmosphere, thus maintaining the volume inside of cylinder 4 behind piston 5 (on the right-hand side of piston 5 in FIG. 1) "unpressurized". A workpiece W is now advanced (in FIG. 3 from the left) on a suitable support U—manually or automatically—in the direction of the outlined arrow in FIG. 3 until it strikes stop 12 and moves it slightly so stop 12 is pushed back somewhat and recedes behind its setpoint position defined by plane S. This displacement causes rod 15 to be moved with respect to limit switch 17 which is firmly attached to carriage 3. The actuating head 19 is released from the feeler pin 18, thereby causing the limit switch 17 to issue a command signal. This signal switches the valve 8 from the position shown in FIG. 3 into the position shown in FIG. 4 in which the pump P supplying compressed air is connected with cylinder 4. Compressed air now flows through the pipe 7 into cylinder 4, building up a pressure inside of a cylinder 4 which acts upon the piston 5, opposing advance motion of the workpiece W (see also the outlined arrows R and Q in FIGS. 3 and 4). The advance motion of the workpiece will gradually reach zero and the pressure inside of the cylinder 4 which continues to act in the direction of arrow Q then pushes the piston 5 and hence the stop 12 back against the direction of advance until the piston 5 strikes the end wall 11 of cylinder 4 and the limit switch 17 is actuated again by the actuating head 19. In this position of the piston, the stop 12 has returned to its setpoint position and, consequently, the workpieces pushed back with it also occupy their setpoint position. Processing, for example, the cutting-off of a length by means of a saw can then be carried out.

After the limit swtich 17 has been actuated again, the pressure in cylinder 4 is maintained for a preselected amount of time by way of a suitable timer in order to retain stop 12 and with it workpiece W in the setpoint position until completion of the processing of the workpiece. The processed workpiece is then removed and after the preselected amount of time has elapsed, the valve 8 returns to the position shown in FIG. 3, to allow a new workpiece to be fed to the assembly.

In cases where the workpiece W is advanced manually against the stop 12, the forward travel of the workpiece is discontinued as soon as the stop 12 has been moved back out of its setpoint position by a small distance. In cases where the workpiece W is advanced mechanically, the limit switch 17 can be put to double use by cutting off the advancing mechanism at the same time as the valve 8 is actuated to admit compressed air into cylinder 4 so that the workpiece W will advance by a small distance only, for example, due to the inertia of the workpiece, and it will then be stopped immediately by the force of the compressed air entering the cylinder 4.

In any case, the design of the stop as described above and its control system result in cushioned, damped deceleration of the workpiece, with the stop 12 receding some distance, and subsequent precise return of the workpiece to its setpoint position.

What is claimed is:

1. Pneumatically operated stop for advanced workpieces, characterized by the following features:
   (A) a pneumatic cylinder (4) with a displaceable piston rod (6) on which the stop (12) is secured;
   (B) a limit stop (11) coacting with said extended piston rod (6) to define the setpoint position (S) of said stop;
   (C) a limit switch (17) for sensing said setpoint position (S) of said stop (12) and for generating a signal when said stop moves away from said setpoint position;
   (D) a valve (8) connected with said pneumatic cylinder (4) and controlled by said limit switch (17), said valve
      1. connecting said cylinder (4) in an unpressurized manner with the ambient atmosphere when said stop (12) is occupyig said setpoint position (S) and no workpiece (W) is resting against said stop,
      2. applying pressure to said cylinder (4) as soon as said stop (12) has been displaced from its setpoint position (S) by an advanced workpiece (W) in order to return said stop together with said workpiece to said setpoint position, and
      3. maintaining this pressure for a preselected amount of time.

* * * * *